United States Patent [19]

Willis et al.

[11] 4,347,071
[45] Aug. 31, 1982

[54] APPARATUS FOR PRODUCTION AND CUTTING OF GLASS FIBRES

[75] Inventors: John H. Willis, Anderson, S.C.; Trevor C. Heath, Yateley, England

[73] Assignees: TBA Industrial Products, Limited, Manchester, United Kingdom; Bishop & Associates, Incorporated, Greenville, S.C.

[21] Appl. No.: 236,362

[22] Filed: Feb. 20, 1981

Related U.S. Application Data

[63] Continuation of Ser. No. 97,249, Nov. 26, 1979, abandoned.

[30] Foreign Application Priority Data

Nov. 24, 1978 [GB] United Kingdom ............... 45911/78

[51] Int. Cl.³ .......................................... C03B 37/025
[52] U.S. Cl. ......................................... 65/10.2; 65/2; 83/347; 83/913
[58] Field of Search ........................... 65/10.2, 2, 10.1; 83/347, 913

[56] References Cited

U.S. PATENT DOCUMENTS 2,846,157  8/1958  Stephens et al. ................. 242/18 G
4,175,939 11/1979  Nakazawa et al. .................. 65/10.2

Primary Examiner—Robert L. Lindsay, Jr.
Attorney, Agent, or Firm—William A. Drucker

[57] ABSTRACT

Apparatus for drawing newly-spun and dressed glass filaments from a bushing comprises, in combination, a rotary cutter constituted by a blade roll with radially directed blades projecting from its surface and a second, back-up roll having a resilient surface, said rolls being mounted with their axes substantially parallel and with at least the tips of the blades in contact with said resilient surface to define a cutting zone for the cutter, together with an auxiliary, independently driven start-up roll, variable speed drive means for accelerating said auxiliary roll to a surface speed at least equal to the surface speed of the back-up roll under production conditions, and guide means operable to divert a bundle of filaments being wound on said auxiliary roll to the surface of the back-up roll and thereafter into the cutting zone of the cutter, whereby the filaments are cut into staple fibres. A method of manufacturing staple fibres based on the use of above apparatus is also disclosed.

8 Claims, 3 Drawing Figures

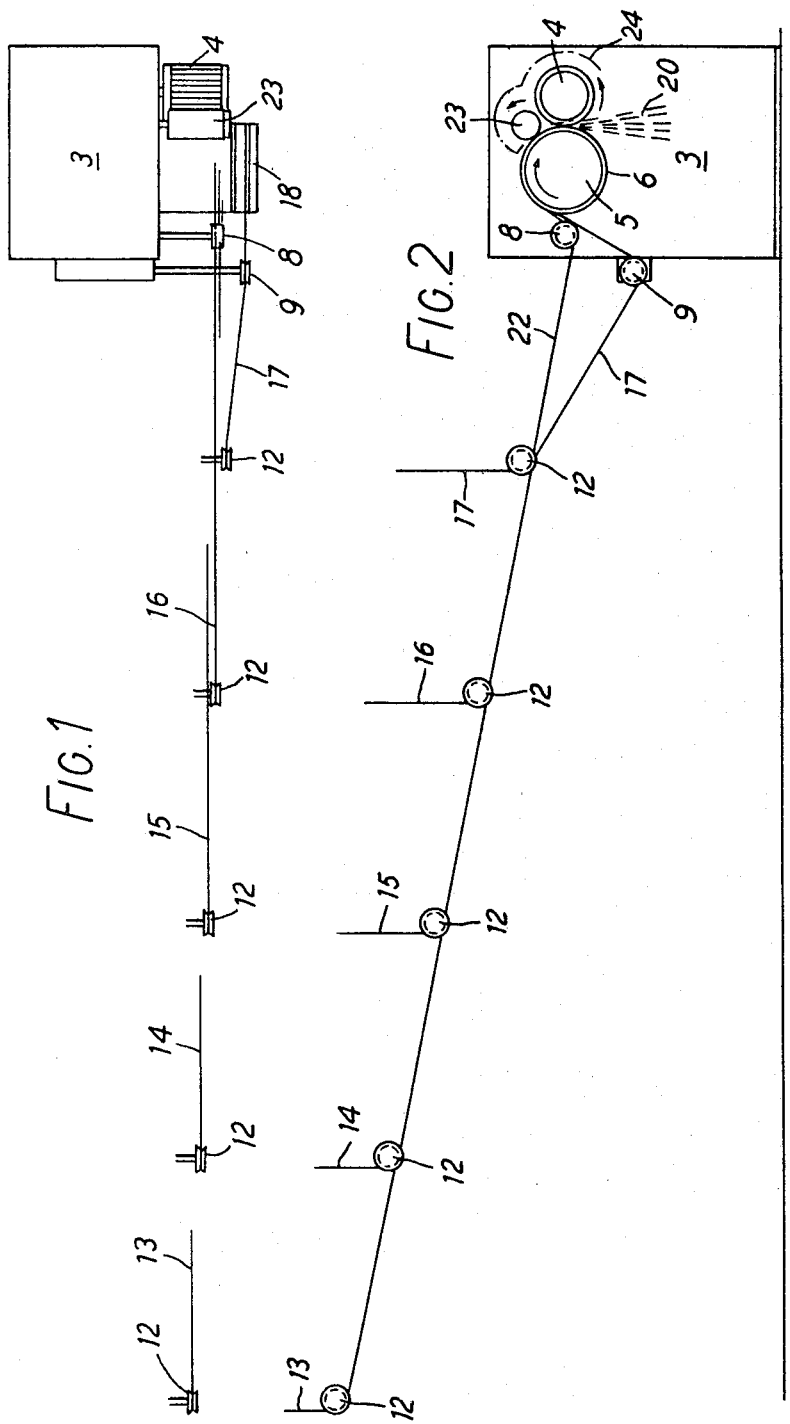

4,347,071

APPARATUS FOR PRODUCTION AND CUTTING OF GLASS FIBRES

This is a continuation of Ser. No. 97,249 filed Nov. 26, 1979 now abandoned.

TECHNICAL FIELD OF THE INVENTION

This invention relates to the manufacture of staple glass fibres by cutting newly-formed filaments drawn directly from a bushing.

THE PRIOR ART

Glass filaments are produced by rapid attenuation of cones of molten glass formed at the orifices of a heated bushing. It is usual to produce a relatively large number of filaments simultaneously; these are drawn off, treated with an aqueous dressing/size which may contain up to 10% by weight of solids and then collected by winding as a bundle into a package. This package may then be converted into staple fibres, in a separate operation, by unwinding the filaments and passing them through a cutter. This is a dry or partially dry cutting process because the dressing/size applied to the newly-spun filaments to facilitate winding and handling is usually at least partly dry by the time the material reaches the cutter. The filaments may, however, be converted to staple fibres in a rather different manner, by cutting the newly-spun and dressed filaments directly from the bushing, without any intermediate winding step. In this case, the cutter is used to draw/attenuate the filaments from the bushing. Normally a single cutter is used to cut simultaneously all of the bundles of filaments from a plurality of bushings, in the interests of maximum productivity. Because it is inconvenient to start up several bushings at once, the usual procedure is to start up the first bushing and then run the cutter up to full production speed to attenuate and cut the filaments from that bushing. Thereafter, the remaining bushings are started up in turn and in each case the respective bundles of filaments have to be progressively accelerated and introduced to the cutter, which is of course already running at full speed. Means for achieving this progressive acceleration to production speed are known; U.S. Pat. No. 3,815,461 discloses one example in which a tapered or conical pressure roll is used to progressively accelerate a bundle of filaments to the speed of the cutter.

It has also been proposed that a separate, auxiliary cutter should be used, with the object of progressively accelerating the filaments to the normal production speed of the bushing, whilst at the same time chopping the filaments to form waste. Once accelerated, the filaments are diverted to the main cutter to join the, or any other filaments already being chopped there. This proposal (published after the priority date of this present application) calls for the accelerating filaments to be chopped into waste and as the prosposal itself points out, these filaments are relatively thick and difficult to chop, so that the auxiliary cutter is subject to rapid wear.

By contrast to the prior proposal the present invention provides a simple and effective start-up procedure, without the need for a tapered roll arrangement or an auxiliary cutter.

BRIEF DESCRIPTION OF THE INVENTION

According to the present invention apparatus for drawing newly-spun and dressed glass filaments from a bushing comprises, in combination, a rotary cutter constituted by a blade roll with radially directed blades projecting from its surface and a second, back-up roll having a resilient surface, said rolls being mounted with their axes substantially parallel and with at least the tips of the blades in contact with said resilient surface to define a cutting zone for the cutter, together with an auxiliary, independently driven start-up roll, variable speed drive means for accelerating said auxiliary roll to a surface speed at least equal to the surface speed of the back-up roll under production conditions, and guide means operable to divert a bundle of filaments being wound on said auxiliary roll to the surface of the back-up roll and thereafter into the cutting zone of the cutter, whereby the filaments are cut into staple fibres.

The auxiliary, independently driven start-up roll may be mounted for rotation about the same axis as the back-up roll, but spaced a short distance axially therefrom, or it may be mounted for rotation about an axis parallel to the axis of the back-up roll and spaced therefrom in the general direction of travel of the filaments approaching said roll. The guide means is preferably constituted by a pulley displaceable in a direction parallel to the axis of the back-up roll from a first position in which a bundle of filaments is presented to the auxiliary start-up roll for winding thereon to a second position in which said bundle is presented to the back-up for forwarding into the cutting zone of the cutter.

Preferably the cutter is of the kind set forth in our co-pending application of even date wherein the projecting portions of the blades engage the resilient surface of the back-up roll so as to be fully embedded therein at the point of contact between the rolls.

The invention also provides an improvement in the method of manufacturing of staple glass fibres by drawing a plurality of glass filaments from a bushing and chopping them directly into staple fibers without intervening winding and storage, the improvement comprising the steps of initiating said drawing by forming said filaments into a coil on the circumference of an auxiliary roller, forming an initial winding thereon by rotating said roller with a progressively increasing surface speed until the filaments advancing towards said roller attain the normal production drawing speed for said bushing, then diverting said filaments, whilst still travelling at said speed and without breaking them, into driving contact with a cutter back-up roll driven with substantially the same surface speed as said production speed, advancing said diverted filaments by means of said roll into a cutting zone whereat they are both severed from said initial winding and continuously chopped into staple fibers, followed by stopping said auxiliary roller and removing the initial winding therefrom.

In particular, the method just recited is preferably applied to bundles of filaments from a plurality of bushings, each bundle in turn being accelerated to production drawing speed and thereafter diverted into a single, common cutting zone. It is particularly preferred that the bundles of filaments are diverted into a nip defined between a press roll co-operating with the cutter back-up roll to advance the diverted filaments into the cutting zone, whereby the degree of driving contact between the diverted filaments and the back-up roll is enhanced.

DESCRIPTION OF A PREFERRED EMBODIMENT OF THE INVENTION

Figure 3:
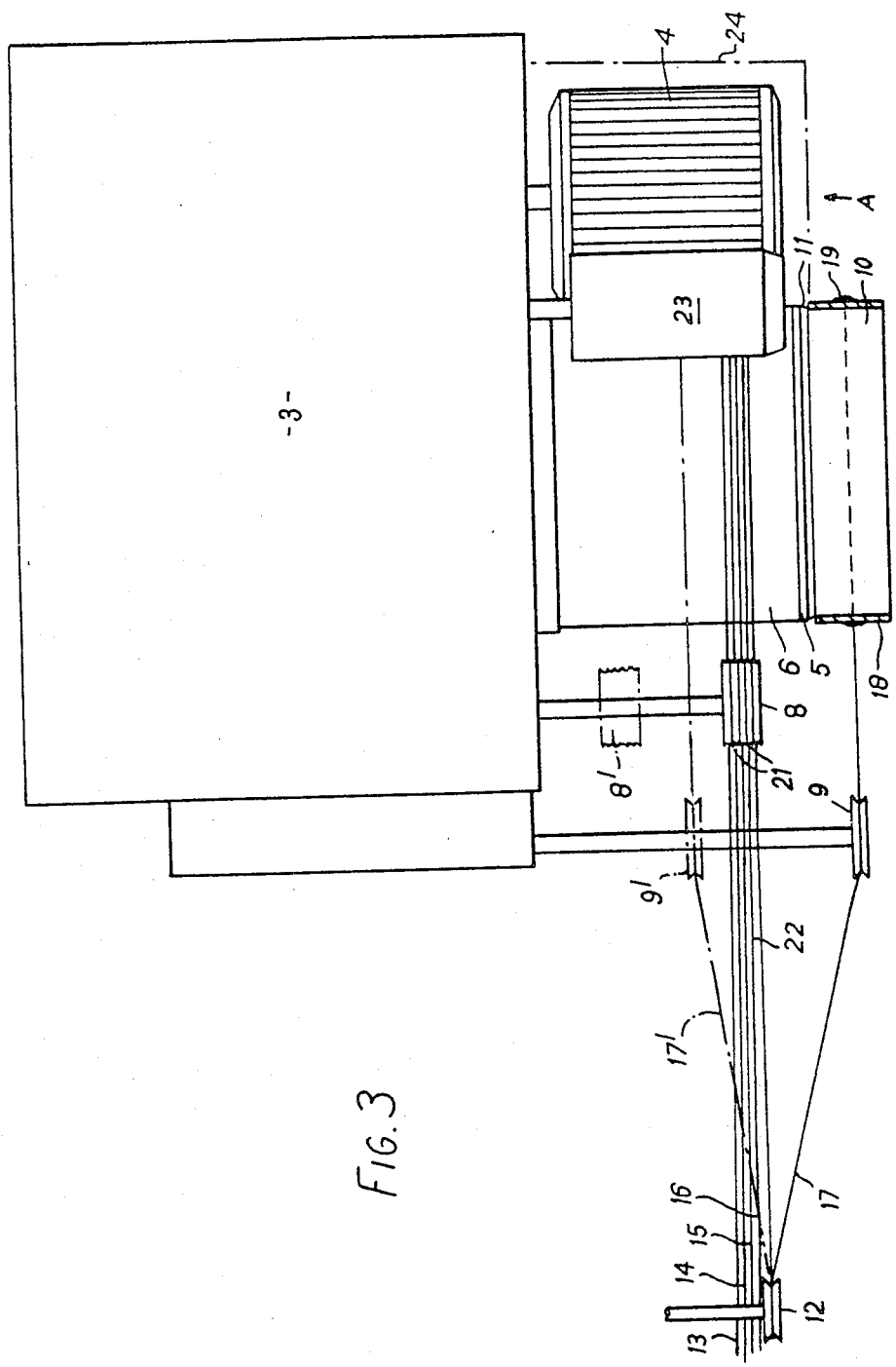

In order that the invention be better understood a preferred embodiment of it will now be described by way of example with reference to the accompanying drawings in which:

FIG. 1 is a schematic plan view of part of an apparatus for producing staple glass fibres direct from a plurality of bushings, FIG. 2 is a schematic side elevation of the apparatus of FIG. 1 taken in the direction A of said figure, and FIG. 3 is an enlarged view of part of the apparatus of FIG. 1.

Referring to both figures, a main drive unit 3 supports a blade roll 4 and a back-up roll 5, the latter having a resilient surface 6. The blades of the cutter roll are shown at 7 in FIG. 2. The drive unit also supports a main guide 8 axially reciprocable between its indicated position and the position 8' shown by dotted lines. An auxiliary guide 9 is provided below the main guide 8; the auxiliary guide is reciprocable between its indicated position and a second position 9' shown by dotted lines.

Mounted coaxially with the back-up roll 5 is an auxiliary start-up roll 10 which is independently driven by variable speed drive means (not shown) contained within the main drive unit 3. The roll 10 is of slightly smaller diameter than the back-up roll in order to accommodate a paper, plastics or metal sleeve 18, as discussed below. It is spaced axially from the back-up roll so as to be completely freely rotatable with respect thereto, but the axial gap between the two rolls is effectively closed by means of a skirt portion 11 on the back-up roll extending towards and into the interior of the auxiliary roll so that a small radial clearance exists between said rolls.

Spaced from the apparatus are a number of further guide rolls 12, one for each bushing. Five such guide rolls 12 are shown although this number will naturally be varied to suit the number of bushings. In the interests of simplicity, the bushings themselves are not shown, although the filaments therefrom are shown in FIGS. 2 and 3 at 13, 14, 15, 16, and 17 respectively. The operation of the apparatus is as follows. A disposable paper sleeve 18 is fitted to the auxiliary roll 10 thereby increasing its effective diameter to roughly that of the back-up roll. The cutter is thereafter started and run up to its operating speed. The first bundle of filaments 17 is brought under the auxiliary guide 9 and given an initial wrap around the paper sleeve 18 and the auxiliary roll is set into motion, wrapping the filaments 17 onto it to form a small cake 19, whilst the roll is accelerated to the surface speed of the back-up roll, 5. As it approaches this speed, the auxiliary guide 9 is traversed towards its dotted line position, thereby dragging the bundle of filaments laterally sideways (17') and onto the back-up roll and into the cutting zone 19 of the cutter, where the bundle is cut into staple fibres 20. The cutter itself and its operation is fully described in our co-pending application of even date and need not be further discussed here. As soon as cutting begins, the small cake 19 and its paper sleeve 18 is redundant; the auxiliary roll 10 can be stopped and the paper sleeve replaced by a new one, prior to repeating the cycle with a second bundle of filaments. However, before doing so the running bundle of filaments 17 is manually diverted from the auxiliary guide 9, to the main guide 8, which has a plurality of circumferential grooves 21 in its surface, one groove for each bundle of filaments to be simultaneously processed into staple fibres. This guide is continuously reciprocated parallel to the axis of the back-up roll so as to even out the wear on the latter and on the cutter blades by causing the filaments to be traversed over at least a major part of the width of the latter.

The acceleration and subsequent introduction of each successive bundle of filaments to the cutter is carried out in like manner to the first bundle, until all five bushings are feeding the cutter, the bundles of filaments then following the approximate line 22 from the guide pulleys 12 to their respective groove on the main guide 8 and thence side-by-side into the cutting zone 19 of the cutter. It will be appreciated that the same procedure can be used to re-introduce a bundle of filaments following the interruption due to a "break-up" at one or more bushings. It should be noted that although an ancillary press roll 23 is shown in running contact with the back-up roll to hold the filament bundles down onto the latter, this is not an essential feature of the apparatus and it can be omitted, exactly as discussed in our aforesaid co-pending application. The blade roll and ancillary press roll are at least partly enclosed by a housing 24.

We claim:

1. In an apparatus for drawing newly-spun and dressed glass filaments from a bushing, of the kind having:
(a) a rotary cutter constituted by a blade roll with radially directed blades projecting from its surface,
(b) a back-up roll having a resilient surface,
(c) means mounting said blade roll and said back-up roll with their respective axes of rotation parallel and with at least the tips of the blades of the blade roll in contact with said resilient surface of the back-up roll to define a cutting zone for the cutter,
(d) an auxiliary start-up roll,
(e) variable speed drive means for accelerating said auxiliary start-up roll to a surface speed at least equal to the surface speed of the cutter roll under production conditions,
(f) guide means operable to divert a bundle of filaments being wound on said auxiliary start-up roll to the surface of the back-up roll and thereafter into the cutting zone of the cutter, whereby the filaments are cut into staple fibers,
the improvement that said auxiliary start-up roll is adapted to receive plural turns of a bundle of filaments wound thereon to form a cake such that said bundle may be subjected to drawing as said start-up roll rotates.

2. An apparatus, as claimed in claim 1, wherein said auxiliary start-up roll has its diameter less than the diameter of said back-up roll, thereby to permit the placing of a disposable sleeve about the start-up roll to make its external diameter substantially equal to that of the back-up roll.

3. Apparatus, as claimed in claim 2, comprising a disposable sleeve of flexible sheet material disposed about said start-up roll.

4. Apparatus, as claimed in claim 1, wherein said start-up roll is mounted for rotation about the same axis as the back-up roll, and is spaced axially therefrom.

5. Apparatus, as claimed in claim 1, wherein said start-up roll is mounted for rotation about an axis parallel to the axis of the back-up roll and is spaced therefrom in the general direction of travel of filaments approaching said back-up roll.

6. Apparatus, as claimed in claim 4, wherein said back-up roll includes a skirt portion extending axially therefrom and into the interior of the start-up roll with a small radial clearance between said rolls.

7. Apparatus, as claimed in claim 1, wherein said guide means is constituted by a pulley displaceable in a direction parallel to the axis of the back-up roll from a first position in which a bundle of filaments is presented to the auxiliary start-up roll for winding thereon to a second position in which said bundle is presented to the back-up roll for forwarding to the cutting zone of the cutter.

8. Apparatus, as claimed in claim 1, comprising a press roll in running contact with said back-up roll and operable to hold a bundle of filaments against said back-up roll during forwarding to the cutting zone of the cutter.

* * * * *